Aug. 18, 1936.  W. A. HALLETT ET AL  2,051,212

PHOTOGRAPHIC FILM SPOOL

Filed March 28, 1935

Inventors:
William A. Hallett &
Maynard D. Lee,

By

Attorneys

Patented Aug. 18, 1936

2,051,212

UNITED STATES PATENT OFFICE 2,051,212

PHOTOGRAPHIC FILM SPOOL

William A. Hallett and Maynard D. Lee, Rochester, N. Y., assignors to Eastman Kodak Company, Rochester, N. Y., a corporation of New York Application March 28, 1935, Serial No. 13,404

5 Claims. (Cl. 242—71)

This invention relates to spools, and particularly to spools which are adapted for receiving convolutions of film and light protecting paper for photographic purposes.

One object of our invention is to provide a simple type of all-metal film spool which is inexpensive to make and which is strong. Another object of our invention is to provide a film spool with a key-winding slot which is sufficiently strong to withstand the twisting action of a comparatively small film winding key without becoming distorted. Another object of our invention is to provide a tubular sheet metal hub so shaped that it may form a trunnion for the spool, the extreme end of which is provided with a transverse, narrow slot for receiving a winding key, and other objects will appear from the following specification, the novel features being particularly pointed out in the claims at the end thereof.

Coming now to the drawing wherein like reference characters denote like parts throughout:

The present trend in camera construction is to produce extremely small cameras requiring small and light-weight film spools. It is somewhat difficult to provide in such spools a slot for the reception of a small winding key which will properly receive the winding key and which will not become distorted or misplaced by turning the key.

Figure 1:
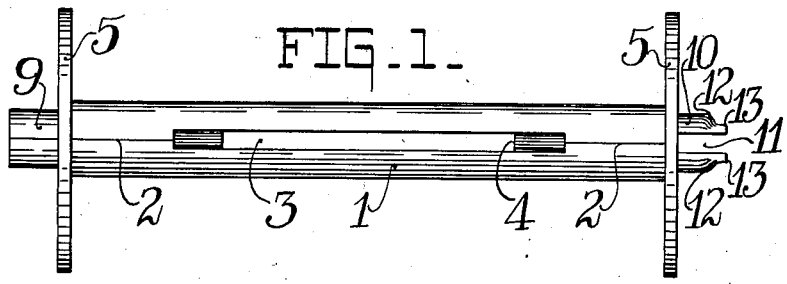
Fig. 1 is a side elevation of a spool constructed in accordance with and illustrating a preferred embodiment of our invention.

In Fig. 1 we have shown a preferred embodiment of our invention designed to overcome the present difficulties. In accordance with this figure, the spool may be formed of a core 1 which is preferably made from a sheet metal blank rolled up into substantially cylindrical form. The edges of the blank may abut each other along the line 2, and we prefer to form a slot 3 in one side, somewhat longer than the slot 4 in the other side of the film spool, as is customary for receiving the end of the film backing paper.

Figure 2:
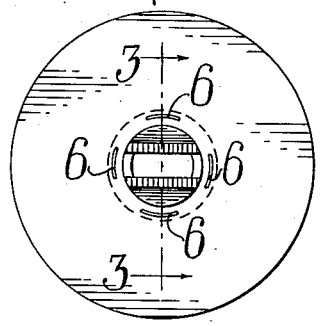
Fig. 2 is an end view of the spool shown in Fig. 1, but on a somewhat enlarged scale.
Figure 3:
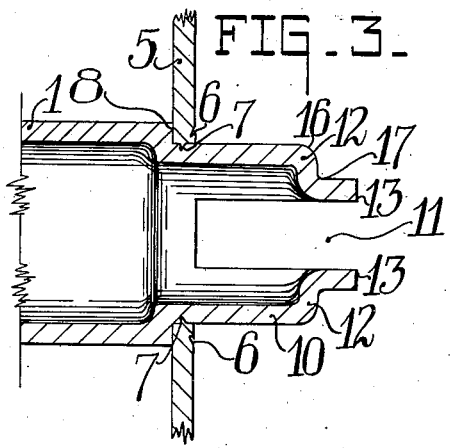
Fig. 3 is a fragmentary, enlarged section taken on the line 3—3 of Fig. 2.

On the ends of the sheet metal hub 1, there are flanges 5, these flanges being attached to the hub in any desired manner, such as by staking. As indicated in Fig. 2, the flanges may be staked on by a tool which forms a plurality of indentations 6 which, as shown in Fig. 3, cause a small amount of the metal from the film flanges 5 to be forced downwardly into the hub 1, as indicated at 7. These indentations securely hold the film spool flanges on the hub.

If desired, the hub member 1 may be provided with an annular shoulder 8 against which the inside edge of a flange 5 may rest, as this somewhat strengthens the spool.

Our invention is particularly directed to the slotted end of the film spool. While it is customary to provide a slot on only one end, as shown in Fig. 1, it is sometimes necessary or desirable to slot both ends.

As will be seen from Fig. 1, the spool is provided with a pair of trunnions 9 and 10 on which the spool may turn, these trunnions being substantially cylindrical in shape throughout the greater portion of their length. Trunnion 9, which is here shown as not being slotted, is cylindrical throughout its length, whereas trunnion 10, which includes a slot 11 for receiving a film winding key, is cylindrical throughout the greater portion of its length, but toward the outer end of the trunnion, the cylindrical metal walls are deformed by forcing the metal inwardly so that the extreme end of the trunnion is provided with a pair of spaced, parallel, outwardly facing metal edges 13 which form walls of the slot 11 extending transversely of the film core.

Figure 4:
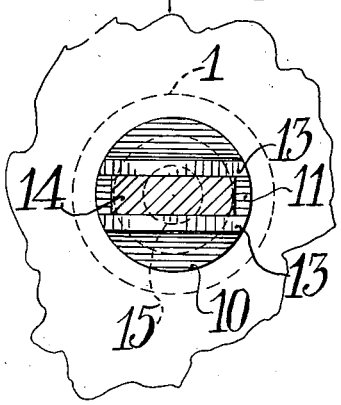
Fig. 4 is an enlarged, fragmentary end elevation showing the slotted end of the film spool with a winding key in place.

Referring particularly to Fig. 4, it will be seen that the outwardly facing parallel walls 13 leave an accurately spaced slot 11 for the reception of a film winding key 14. With the walls extending transversely of the core member 1, it is immaterial whether the winding key 14, which is carried by a shaft 15, is accurately centered with regard to the hub, because the walls 13 so closely approach the walls of the winding key 14 that there is no possibility of the key becoming dislodged and distorting or tearing the metal in the end of the hub as is sometimes the case with known types of spools.

Figure 5:
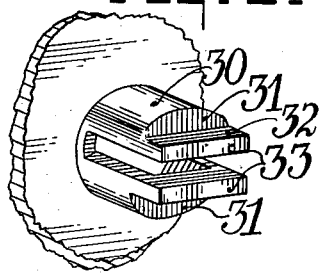
Fig. 5 is a fragmentary perspective view of a modified form of the slotted hub end.

Fig. 5 shows a slight modification over the type of slot shown in Fig. 3.

In Fig. 3 and in the preceding figures, the metallic walls of the spool trunnion 10 are deformed by bending the metal into intersecting curves, as is shown at 16 and 17 of Fig. 3. This type of key slot can be readily formed by the proper tools and is well suited for film spools of sufficient size to permit the walls to be deformed in this manner.

However, in extremely small spools, it may be necessary to form the metal inwardly at a sharp angle, as is shown in Fig. 5. In this figure the spool trunnion 30 is provided with a shoulder 31 at which point the metal is formed sharply downwardly toward the center of the core. The metal is then compressed in such a manner that there is a short flange 32 leading to the metal edges 33, which face outwardly toward the end of the spool as do the flanges 13 of the first described embodiment of our invention.

This type of spool has the advantage that an extremely small area near the end of the trunnion is distorted so that a considerable area of the trunnion 30 is left on which the key end of the spool may rotate. This is desirable in the case of extremely small spools, although the forming operation is somewhat more difficult than is necessary for the preferred embodiment of our invention.

In both embodiments of our invention it should be noted that the key slot consists of two parallel, spaced apart metal edges which face outwardly toward the end of the spool and which form between them rigid edges for a slot to receive the film winding key.

Since the metal is deformed from a cylindrical shape to form these edges, the deforming operation actually reinforces or strengthens the walls of the slot, and we have found that such edges are entirely satisfactory with the various types of winding keys used on small cameras now on the market.

Having thus described our invention, what we claim as new and desire to be secured by Letters Patent of the United States is:

1. A film spool for photographic cameras including a one piece tubular sheet metal hub, spaced flanges carried by the hub, said hub being slotted at at least one end, the slotted end of the hub including a relatively small area of the hub at the end of the slot in which the metal of the hub is deformed inwardly toward the slot, closing the tubular end except for the slot, the end walls of the deformed portion forming parallel, spaced metallic edges facing outwardly from the core at the extreme end of the spool, whereby a slot is formed by the sides of said edges to receive a winding key.

2. A core for film spool comprising a single sheet of metal rolled up into substantially cylindrical form, at least one end of the cylinder including small wall portions deformed on two sides toward the center of the cylinder partially closing the cylinder, said deformed walls terminating at the extreme end in parallel relation, the parallel walls extending completely across the end of the hub and projecting outwardly therefrom.

3. A core for film spool comprising a single sheet of metal rolled up into substantially cylindrical shape throughout all of its length except for a small portion at the extreme end thereof, at which portion the metal is compressed from both sides to partially fill the opening in the cylindrical hub, said compressed portion terminating at the extreme end of the hub in parallel metallic edges facing and extending outwardly from the cylindrical portion of the core and extending transversely of the cylindrical member and spaced to leave a slot therebetween.

4. A film spool for photographic cameras including a one-piece sheet metal tube forming a hub, flanges carried by the hub, at least one end of the hub including a deformed metal end partially enclosing the end of the tube, the end terminating in a pair of parallel spaced edges projecting outwardly from the hub and forming between them a slot adapted to receive a winding key.

5. A film spool for photographic cameras including a one-piece sheet metal tube constituting a hub, flanges carried by the hub and spaced from the ends thereof whereby the ends of the tube constitute trunnions of substantially cylindrical shape on which the spool may turn, the metal near the end of at least one trunnion being deformed from its cylindrical shape to partially enclose the end of the tube and terminating in two parallel metal edges spaced apart and extending outwardly from the hub forming a slot therebetween adapted to receive a winding key.

WILLIAM A. HALLETT.
MAYNARD D. LEE.